United States Patent [19]

Reed

[11] Patent Number: 5,439,198
[45] Date of Patent: Aug. 8, 1995

[54] VALVE APPARATUS

[76] Inventor: Leonard T. Reed, 2947 Kathy Jo La., Grand Junction, Colo. 81503

[21] Appl. No.: 225,805

[22] Filed: Apr. 11, 1994

[51] Int. Cl.6 .................. F16K 31/60; F16K 3/314
[52] U.S. Cl. ............................ 251/231; 4/323; 137/899; 251/326; 251/329
[58] Field of Search .................. 4/323; 137/899; 251/231, 326, 327, 328, 329; 74/519, 523

[56] References Cited

U.S. PATENT DOCUMENTS

| | | | |
|---|---|---|---|
| 104,128 | 6/1870 | Eggsleston | 251/326 |
| 973,435 | 10/1910 | Hoyt | 251/231 |
| 1,168,332 | 9/1914 | Riley | 251/326 |
| 1,881,367 | 10/1932 | McKesson | 251/231 |
| 1,912,765 | 6/1933 | Erni | 251/326 |
| 2,885,174 | 5/1959 | Setka | 251/329 |
| 3,316,929 | 5/1967 | Milette | 251/329 |
| 3,333,814 | 8/1967 | Sargent | 251/329 |
| 3,412,972 | 11/1968 | Williams et al. | 251/329 |
| 3,941,349 | 3/1976 | Pierson | 251/326 |
| 4,007,911 | 2/1977 | Clarkson | 251/231 |
| 4,026,517 | 5/1977 | Still | 251/231 |
| 4,231,389 | 11/1980 | Still et al. | 251/326 |
| 4,275,866 | 6/1981 | Jamar | 251/329 |
| 4,483,509 | 11/1984 | Lewcock et al. | 251/231 |
| 4,523,339 | 6/1985 | Levoie | 251/327 |
| 4,875,504 | 10/1989 | Nicholson | 251/291 |

*Primary Examiner*—George L. Walton
*Attorney, Agent, or Firm*—Donald W. Erickson

[57] ABSTRACT

A valve apparatus for use with a holding tank of a recreational vehicle which has a manually operated valve actuator. The apparatus includes a pivotable actuating lever which is connected to a clevis having mounted therein a clevis pin that is slidably received in a guide channel. The clevis pin is joined by a connecting rod to a laterally, slidable gate valve so that the valve moves in response to lateral movement of the activating lever.

3 Claims, 2 Drawing Sheets

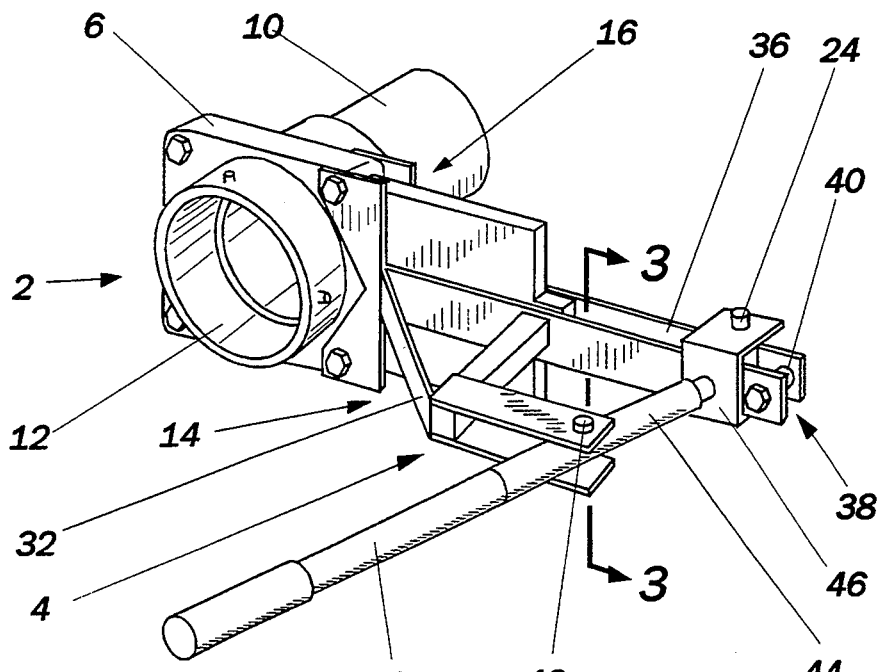
FIG. 2
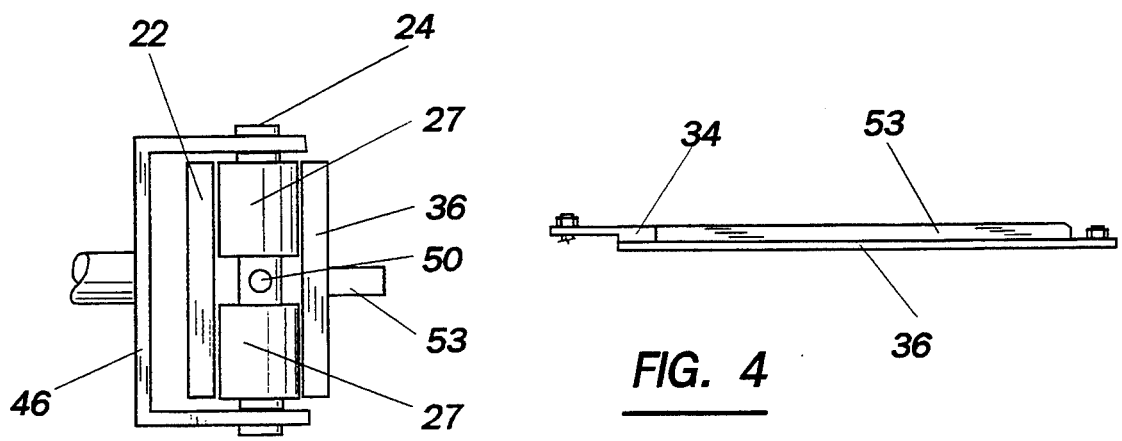
FIG. 3
FIG. 4

VALVE APPARATUS

BACKGROUND OF THE INVENTION

This invention relates to a valve apparatus having a manually operated valve actuator for use with holding tanks of recreational vehicles. Typical valve apparatus for use with holding tanks is shown by Nicholson, U.S. Pat. No. 4,875,504, issued Oct. 24, 1989 (manual or electromechanical valve actuator), Norman, U.S. Pat. No. 4,550,453, issued Nov. 5, 1985 (manual valve actuator) and Pierson, U.S. Pat. No. 3,941,349, issued Mar. 2, 1976 (electromechanical or manual valve actuator).

SUMMARY OF THE INVENTION

A valve apparatus for use with a holding tank of a recreational vehicle which has a manually operated valve actuator. The valve apparatus is characterized by ease and convenience of use, positive engagement and seating of the laterally slidable valve, reliability and durability. The apparatus includes a pivotable actuating lever which is connected to a clevis having mounted therein a clevis pin that is slidably received in a guide channel. The clevis pin is joined by a connecting rod to a laterally, slidable gate valve so that the valve moves in response to lateral movement of the activating lever. The actuator system includes front and back mounting plates which are attached to the drain and valve housing. The front and back mounting plates cooperatively form the guide channel. The front mounting plate also includes pivot arms for the actuating lever and bracing to provide sturdiness and durability. The actuating lever is provided with a removable handle for ease of operation of the actuator.

BRIEF DESCRIPTION OF THE DRAWINGS

FIG. 2 is a perspective view of my valve apparatus in accordance with the present invention with the valve in the open position;

FIG. 3 is a cross section view along lines 3—3 of FIG. 2; and

FIG. 4 is a top view of the back mounting plate.

DETAILED DESCRIPTION OF THE INVENTION

Figure 1:
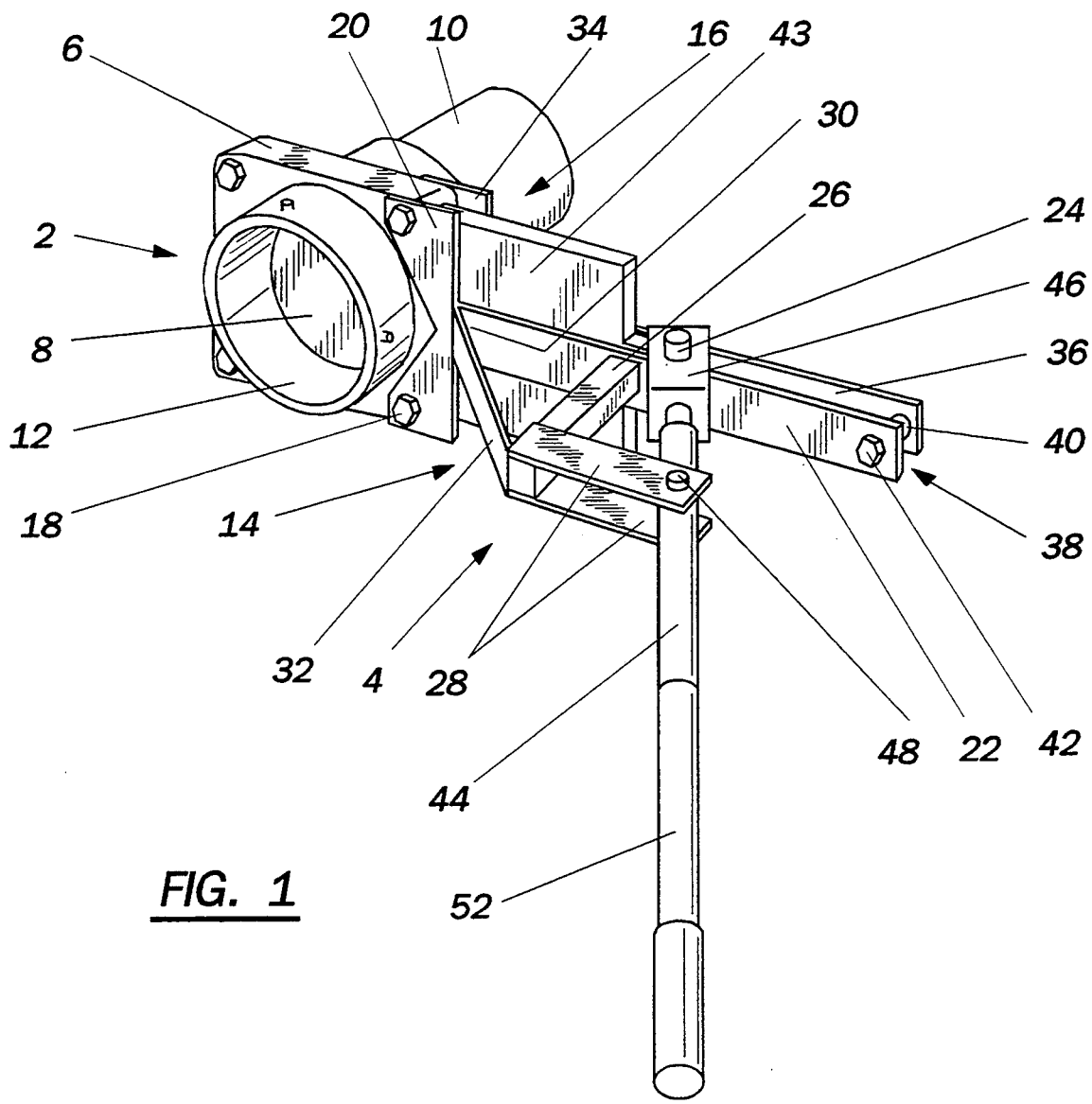
FIG. 1 is a perspective view of my valve apparatus in accordance with the present invention with the valve in the closed position.

With reference to the drawings such as FIG. 1, there is shown a conventional drain valve assembly 2 and a manual valve actuator 4 in accordance with the present invention. The drain valve assembly comprises a drain and valve housing 6, laterally slidable valve 8, internal drain pipe 10 and external drain pipe connection 12. The drain pipe 10 is connected to a holding tank (not shown) of a recreational vehicle. The drain pipe connection 12 is connected to a storage drain tank (not shown) for drainage of the holding tank.

The manual valve actuator of the present invention includes a front mounting plate 14 and back mounting plate 16 which are attached to the front and back, respectively, of the drain and valve housing 6 as, for example, by hex bolts 18.

The front mounting plate 14 includes a V-notched plate 20 which is adapted to be secured to, as by bolts 18, the front of housing 6 and of approximately the same height dimension as the housing. The V-notch allows space for the circumference of the outer drain pipe 12.

At about mid-point of the height of plate 20, a front guide plate 22 is abutted and attached as, for example, by welding to the side edge of plate 20 so that the guide plate extends latitudinally and at about a 90 degree angle from the side of plate 22. This serves as the front wall of the guide channel for clevis pin 24 and sleeve bushings 25 and 27. To the front wall of guide plate 22 is attached pivot post 26 as by welding or other means. The post 26 is perpendicular to the front wall of plate 22. At the front end of pivot post 26 is secured as, for example by welding, pivot arms 28 at a right angle to post 26. From the front end of post 26 to the juncture 30 of guide plate 22 and the side edge of plate 20, there is joined, as by welding for example, a brace bar 32 that gives sturdiness and durability to pivot post 26 and pivot arms 28. The brace bar 32 is at about a 45 degree angle relative to front guide plate 22.

The back mounting plate 16 comprises a V-notched plate 34 which is adapted to be secured by bolts or otherwise to the back of housing 6. As with the front mounting plate 14, the back mounting plate 16 has a back guide plate 36 positioned the same as and of the same dimensions as the front guide plate 22. The distal ends 38 of guide plates 22 and 36 are spaced apart by a tubular guide spacer 40 or other means between the inner walls thereof at a distance substantially equal to the outside diameter of roller bushings 27 on clevis pin 24. The ends 38 are spaced apart as mentioned and joined together as by a hex bolt and nut 42. The back side of mounting plate 16 has a brace plate 53, see FIGS. 3 and 4, attached thereto as by welding, which runs substantially the length of the mounting plate and abuts against plate 34.

To effectuate the lateral bi-directional movement of gate valve 8 within hollow valve housing 43 and housing 6 there is provided an actuating lever tube 44, pivot pin 48, clevis 46, clevis pin 24, roller bushings 27, connecting rod 50 and lever handle 52. Clevis pin 24 is threadedly bored at about midpoint vertically to receive and join to one end of connecting rod 50. The other end of rod 50 is removably connected to slidable valve 8 as by bolting, for example. With reference to FIGS. 1 and 2, as handle 52 is moved to the left, the gate valve 8 moves to right to the open position as shown in FIG. 2 permitting residue from the holding tank to flow through pipes 10 and 12 to a storage tank. As handle 52 moves laterally, the actuating lever 44 pivots on pin 48 and clevis 46, and clevis pin 24, roller bushings 27 are directly responsive to movement of the handle in either direction. Actuating lever 44 is preferably slidably connected to clevis 46. Similarly, handle 52 can be removably attached to the front end of actuating lever 44 as by a slidable connection to lever 44. In that way, the handle 52 can be removed after draining of the holding tank is completed so that the handle does not protrude from the side of the vehicle when the handle is not needed.

What is claimed is:

1. In a valve apparatus for use with a holding tank of a recreational vehicle which comprises a drain valve assembly and a manual valve actuator, said drain valve assembly including a drain pipe, a valve housing and a slidable valve therein, the improvement wherein the manual valve actuation comprises:

a guide channel formed from spaced apart, parallel front and back mounting plates, said plates being releasable attached to said valve housing;

a pivotable actuating lever assembly being affixed to said front mounting plate, said actuating lever assembly including a post member attached to said mounting plates, and a pair of extension arms extending from said post member;

a clevis being slidable along an exterior portion of said mounting plates and being connected to a valve stem of said slidable valve within said channel, said clevis having a clevis pin connected between said pair of extension arms of said clevis, said clevis pin is vertically disposed between and cooperatively slides between said front and back mounting plates and along said guide channel in response to movement of the actuating lever for moving said slidable valve between open and closed positions as said valve stem moves within said channel;

said valve stem being releasably attached to and disposed between said slidable valve and said clevis pin; and said actuating lever being pivotally attached between said extension arms for pivoting said actuator to move said slidable valve between said open and closed positions, said actuating lever being releasably attached to said clevis.

2. The improvement according to claim 1 wherein said clevis pin has roller bushings.

3. The improvement according to claim 2 wherein said actuating lever includes a detachable handle.

* * * * *